(12) United States Patent
Kunc et al.

(10) Patent No.: US 10,198,680 B2
(45) Date of Patent: Feb. 5, 2019

(54) METHOD AND CIRCUIT FOR TUNING AN ANTENNA CIRCUIT OF AN ACTIVELY TRANSMITTING TAG

(71) Applicant: STMicroelectronics International N.V., Schiphol (NL)

(72) Inventors: Vinko Kunc, Ljubljana (SI); Maksimiljan Stiglic, Maribor (SI); Kosta Kovacic, Orehova vas (SI)

(73) Assignee: STMicroelectronics International N.V., Amsterdam (NL)

( * ) Notice: Subject to any disclaimer, the term of this patent is extended or adjusted under 35 U.S.C. 154(b) by 0 days.

(21) Appl. No.: 15/913,003

(22) Filed: Mar. 6, 2018

(65) Prior Publication Data

US 2018/0197059 A1 Jul. 12, 2018

Related U.S. Application Data

(62) Division of application No. 14/426,146, filed as application No. PCT/EP2013/068274 on Sep. 4, 2013, now Pat. No. 9,946,966.

(30) Foreign Application Priority Data

Sep. 5, 2012 (SI) .................................. 201200274

(51) Int. Cl.
*G06K 19/07* (2006.01)
*H01Q 1/22* (2006.01)
(52) U.S. Cl.
CPC ....... *G06K 19/0726* (2013.01); *H01Q 1/2208* (2013.01)

(58) Field of Classification Search
CPC ......... G06K 19/0726; G06K 19/07773; G06K 7/10316; H01Q 1/2208; H01Q 1/2225; H01Q 9/0442; H04B 5/0062; H04B 5/0081
See application file for complete search history.

(56) References Cited

U.S. PATENT DOCUMENTS

| 6,272,321 B1 | 8/2001 | Bruhnke et al. |
| 7,058,372 B1 | 6/2006 | Pardoen et al. |
| 8,798,535 B2 | 8/2014 | Charrat et al. |
| 2009/0174592 A1 | 7/2009 | Muellner |

(Continued)

FOREIGN PATENT DOCUMENTS

| EP | 2230721 A1 | 9/2010 |
| FR | 2965084 A1 | 3/2012 |

(Continued)

*Primary Examiner* — Laura Gudorf
(74) *Attorney, Agent, or Firm* — Slater Matsil, LLP

(57) ABSTRACT

A circuit includes an antenna circuit including a number of capacitors and an inductor. The antenna circuit is configured to transmit an output signal upon receiving an input transmit signal. A first control block is configured to transmit an enabling signal upon detecting a presence of a supply voltage at a feeding terminal of the actively transmitting tag in response to the actively transmitting tag being inserted into a host device. A VCO is configured to generate the input transmit signal with the frequency of the interrogator carrier signal upon receiving the enabling signal from the first control block and upon receiving the control voltage from the memory. A second control block is configured to enable a subset of the plurality of capacitors of the antenna circuit upon receiving the enabling signal from the first control block.

20 Claims, 2 Drawing Sheets

(56) References Cited

U.S. PATENT DOCUMENTS

2009/0243779 A1    10/2009   Rofougaran
2012/0071090 A1     3/2012   Charrat et al.
2012/0311356 A1    12/2012   Tan

FOREIGN PATENT DOCUMENTS

| WO | 2006106481 A1 | 10/2006 |
| WO | 2009156879 A1 | 12/2009 |
| WO | 2013002736 A1 | 1/2013 |

METHOD AND CIRCUIT FOR TUNING AN ANTENNA CIRCUIT OF AN ACTIVELY TRANSMITTING TAG

CROSS-REFERENCE TO RELATED APPLICATIONS

This application is a divisional of U.S. application Ser. No. 14/426,146, filed on Mar. 4, 2015, which is a National Stage of International Application No. PCT/EP2013/068274, filed on Sep. 4, 2013, which claims benefit of Slovenian Patent Application No. 201200274, filed on Sep. 5, 2012 which applications are hereby incorporated herein by reference.

TECHNICAL FIELD

The present invention relates generally to a means and apparatus for tuning an antenna circuit of an actively transmitting tag to a frequency of an interrogator carrier signal after the tag has been inserted into a host device.

BACKGROUND

The invention relates to a method for tuning an antenna circuit of an actively transmitting tag to a frequency of an interrogator carrier signal, strictly speaking for retuning after a guest miniature card provided with the actively transmitting tag has been inserted into a host device. The invention also relates to a circuit for carrying out such tuning. Tuning according to the invention is carried out automatically.

An actively transmitting tag (PCT/SI2012/000024) is usually provided with an antenna having very small dimensions, and this is why active transmitting of the tag is applied. Communication of the actively transmitting tag with an interrogator proceeds through a magnetic coupling of their coils, which are components of their antenna circuits with resonance frequencies of e.g. 13.56 MHz according to standard ISO 14443 or ISO 15693. Mutual tuning of tag's and interrogator's antenna circuits to each other increases the strength of signals at their antennas by their quality factors. A distance, at which they can still communicate with each other, gets increased.

Typically, an actively transmitting tag is typically applied in a miniature card, for example a micro SD card or a SIM card. The miniature card is intended to be inserted into a host mobile device such as a mobile telephone, personal digital assistant, tablet PC and similar devices. The actively transmitting tag obtains supply voltage from the host device.

Work environment of the actively transmitting tag is considerably altered when inserted together with the miniature card into a host device. Electrically conductive materials incorporated in a host device reduce inductances in a tag's antenna circuit, the embedded dielectric materials increase antenna circuit capacitances, and parasitic capacitances appear.

A resonance frequency of the tag's antenna circuit is changed by insertion of a miniature card into a host device. Production of miniature cards is normally standardized for all mobile host devices, yet the environment of a connector for a miniature card in host devices strongly varies from one device to another. A producer thus cannot design an actively transmitting tag in a way for its antenna circuit to keep the resonance at the frequency of 13.56 MHz in various mobile host devices.

There is known a miniature card having an elongated coil of a thickness of merely 0.5 mm and provided with a high-permeability core, e.g. ferrite core. The coil is arranged in an antenna circuit in an immediate proximity of and along at least one electrically conductive plate, which does not cross a magnetic axis of the coil (FR 2 965 084, FR 2 965 083). A resonance frequency of the antenna circuit having such configuration is set to a frequency of 13.56 MHz and remains unchanged even after the antenna circuit has been inserted into various mobile host devices.

Indeed, this technical solution has solved the technical problem of how to produce such miniature card that an environment in the host device will not change the resonance frequency of the antenna circuit but it is very hard to produce such coil as well as to provide the miniature card with one or two electrically conductive plates. It is much easier to produce a coil with conductive strips on a printed circuit board of the miniature card, however, a magnetic axis of such coil is perpendicular to a plane of the printed circuit board.

SUMMARY

The following description is related to the technical problem of how a method for automatically tuning an antenna circuit of an actively transmitting tag after having been inserted into a host device should be, and of how a circuit for carrying out the method should be.

The three embodiments of the technical solution as proposed allow an automatic tuning of an antenna circuit of an actively transmitting tag after it has been inserted together with a miniature card into a host device such as a mobile telephone, personal digital assistant, tablet PC and similar devices.

BRIEF DESCRIPTION OF THE DRAWINGS

The invention will now be explained in more detail by way of the description of three embodiments of the method and by way of three embodiments of the circuit intended for tuning an antenna circuit within an actively transmitting tag as well as by way of block diagrams. In the figures.

DETAILED DESCRIPTION OF ILLUSTRATIVE EMBODIMENTS

Figure 1:
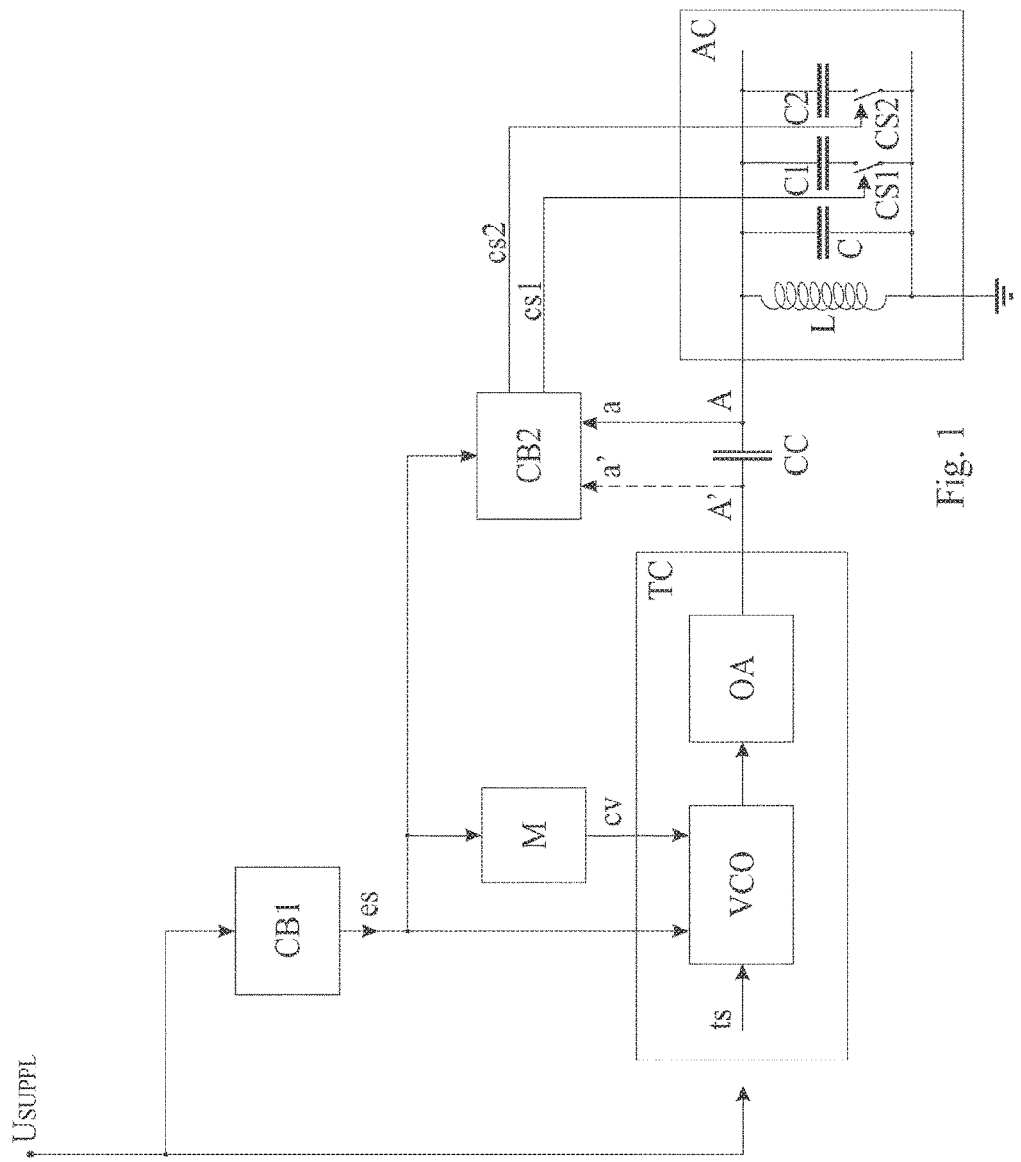
FIG. 1 illustrates a first embodiment of a circuit, which enables tuning a tag's antenna circuit and a tag's controlled oscillator in absence of an interrogator magnetic field.

According to a first embodiment of a method for tuning an antenna circuit of an actively transmitting tag to a frequency of an interrogator carrier signal after the tag has been inserted into a host device, the tag's antenna circuit is excited by an output voltage of a controlled oscillator, e.g., a voltage controlled oscillator, which is controlled by such control voltage for the controlled oscillator to generate an output signal with the frequency of the interrogator carrier signal.

This value of the control voltage was already determined when the actively transmitting tag was produced and was stored in a tag's memory.

The tag's antenna circuit now embedded in the host device is retuned by setting capacitances of capacitors and/or inductances of coils comprised in the antenna circuit in a way that the resonance of the antenna circuit will be at the frequency of the interrogator carrier signal. At the same time, the tag's controlled oscillator is tuned.

The tag's antenna circuit is tuned whenever supply voltage was fed to the actively transmitting tag following a feeding interruption, or is merely tuned after the supply voltage in a host device was supplied to the actively transmitting tag for the first time or after a limited number of switch-ons.

The limited number of switch-ons is application dependent. A reasonable value therefore should be the maximum number of estimated possible reinsertions of the tag into the host device.

The two possible moments for retuning the tag's antenna circuit also apply to the second and third embodiments of the method for tuning an antenna circuit of the actively transmitting tag, yet provided that a magnetic field must exist at a location of the actively transmitting tag due to the interrogator carrier signal.

According to a second embodiment of the method for tuning an antenna circuit of an actively transmitting tag to a frequency of an interrogator carrier signal after the tag has been inserted into a host device, the presence of a supply voltage at a feeding terminal of the tag is first detected. At the same time, the interrogator carrier signal at a location of the actively transmitting tag is verified for presence.

A value of a control parameter, e.g., of a control voltage, for a tag's controlled oscillator is then determined according to a closed-loop method, at which value the controlled oscillator will generate an output signal with the frequency of the interrogator carrier signal. Hereby the tag's controlled oscillator is tuned to the frequency.

Hereafter the tag's antenna circuit is excited by the output signal of the voltage controlled oscillator, which is controlled by the control voltage having the value. Capacitances of capacitors and/or inductances of coils comprised in the antenna circuit are set in a way that the resonance of the antenna circuit is attained at the frequency of the interrogator carrier signal. Hereby the tag's antenna circuit is tuned to the frequency as well.

According to a third embodiment of the method for tuning an antenna circuit of an actively transmitting tag to a frequency of an interrogator carrier signal after the tag has been inserted into a host device, the presence of the interrogator carrier signal is first tried to be detected at a location of the actively transmitting tag.

Hereafter capacitances of capacitors and/or inductances of coils comprised in the tag's antenna circuit are set in a way that the resonance of the antenna circuit is established while being excited by a magnetic field of the interrogator carrier signal. The tag's antenna circuit is tuned to the frequency of an interrogator carrier signal.

A first embodiment of a circuit for tuning an antenna circuit AC of an actively transmitting tag to a frequency of an interrogator carrier signal after the tag has been inserted into a host device is shown in FIG. 1. The embodiment is intended for the case that the antenna circuit AC should also be able to be tuned in absence of a magnetic field of the interrogator carrier signal.

A terminal A of the antenna circuit AC is connected to an output amplifier OA within a transmitting circuit TC. A transmit signal ts is conducted to the output amplifier OA when the actively transmitting tag is operating.

An enabling signal es intended to trigger tuning is generated in a first control block CB1 only after a supply voltage USUPPL has been fed to the block.

According to a variant of the first embodiment, the enabling signal es at the output of the first control block CB1 is generated only after the supply voltage USUPPL has been fed to the actively transmitting tag in the host device for the first time or again after a limited number (cf. above) of switch-ons.

The enabling signal es is conducted to a first control input of a tag's voltage-controlled oscillator VCO, which actually represents any controlled oscillator, and a control input of a memory M. The first control input is foreseen to enable the controlled oscillator.

The memory M stores a value of the control voltage cv in the case of the voltage-controlled oscillator VCO, at which value the controlled oscillator VCO generates a signal with a frequency of the interrogator carrier signal. The value of the control voltage cv was already determined at producing the tag and was stored in the tag's memory M.

An output of the memory M is connected to a second control input of the tag's voltage-controlled oscillator VCO. The second control input is foreseen for the control voltage cv.

The enabling signal es is also conducted to a first control input of a second control block CB2 the input being foreseen to enable the block. The second control block CB2 automatically carries out the tuning of the antenna circuit AC while the antenna circuit is excited by an output signal of the tag's voltage-controlled oscillator VCO, which has now been tuned to a frequency of the interrogator carrier signal.

The terminal A of the antenna circuit AC is connected to a second control input of the second control block CB2, which thus obtains voltage at the terminal A at each setting of the tag's antenna circuit AC. When resonance is achieved the voltage is highest.

A first, a second and further outputs of the second control block CB2 are connected to a control terminal of a first, a second and a further controlled switch CS1, CS2, . . . foreseen for connecting a first, a second and a further capacitor C1, C2, . . . and/or a first, a second and a further coil to the tag's antenna circuit AC. The second control block CB2 automatically turns the controlled switches CS1, CS2, . . . on and off until voltage at the terminal A reaches the peak value.

In its current environment the tag's antenna circuit AC now has attained the resonance at the frequency of the interrogator carrier signal.

According to a variant of the first embodiment of the circuit, the terminal A and a terminal A' of a coupling capacitor CC, which is connected between the tag's antenna circuit AC and an output terminal of the tag transmitting circuit TC, are connected to the second and a third control input, respectively, of the second control block CB2. In this way, the second control block CB2 gets voltages a, a' at the terminals A and A', respectively, as well as a phase difference between them at each individual setting of the tag's antenna circuit AC. When resonance is attained, the phase difference between the voltages a, a' at the terminals A and A' equals $\pi/2$.

Figure 2A:
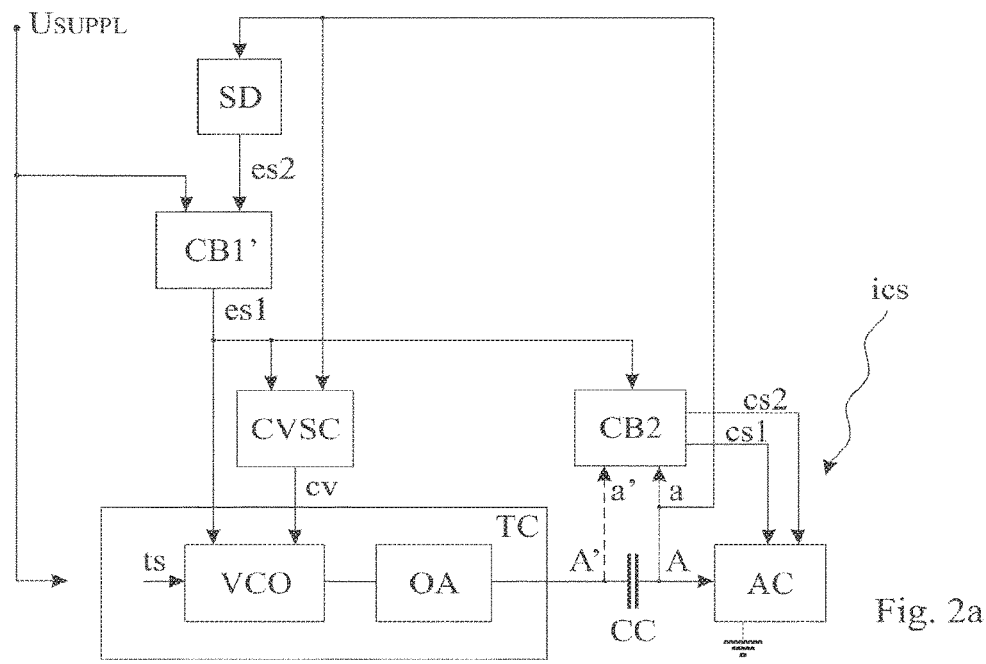
FIG. 2a illustrates a second embodiment of a circuit, which enables tuning a tag's antenna circuit and a tag's controlled oscillator in presence of an interrogator magnetic field.

A second embodiment of the circuit for tuning an antenna circuit AC of an actively transmitting tag to a frequency of an interrogator carrier signal ics after the tag has been inserted into a host device is shown in FIG. 2a. The embodiment is intended for the case that the antenna circuit AC should be tuned in presence of a magnetic field due to the interrogator carrier signal ics.

A first enabling signal es1 is generated in a first control block CB1', which is foreseen to trigger the tuning after a supply voltage USUPPL and a second enabling signal es2 have been conducted to the block.

The second enabling signal es2 is generated in a signal detector SD after the presence of the interrogator carrier signal ics at the location of the actively transmitting tag was detected.

According to variants of the second embodiment of the circuit, the first enabling signal es1 is generated in the first control block CB1' only after the supply voltage USUPPL has been fed to the actively transmitting tag in the host device for the first time or again after a limited number (cf. above) of switch-ons provided that at that time the actively transmitting tag is situated in the interrogator magnetic field.

The first enabling signal es1 is conducted to a first control input of a tag's voltage-controlled oscillator VCO and a first control input of a circuit CVSC foreseen to set a control voltage cv by means of a closed-loop method. The control voltage cv is foreseen to control the voltage controlled oscillator VCO. The first control inputs are foreseen to enable respective circuits.

The first enabling signal es1 is also conducted to a first control input of a second control block CB2, which control input is foreseen to enable the block. The second control block CB2 automatically carries out the tuning of the antenna circuit AC by means of output control signals cs1, cs2, . . . .

A terminal A of the antenna circuit AC is connected to an input of the signal detector SD, which generates the second enabling signal es2. The terminal A is also connected to a second control input of the circuit CVSC, which input is foreseen for a reference frequency being in this way the frequency of the interrogator carrier signal ics.

The control voltage cv as determined in the circuit CVSC is conducted to a second control input of the voltage-controlled oscillator VCO.

The connecting terminal A of the antenna circuit AC is connected to a second control input of the second control block CB2, to which in this way a voltage at the terminal A at a particular setting of the antenna circuit AC is conducted.

A first, a second and further outputs of the second control block CB2 are connected to a control terminal of a first, a second and a further, respectively, controlled switches CS1, CS2, . . . foreseen for connecting a first, a second and a further, respectively, capacitors C1, C2, . . . and/or a first, second and a further, respectively, coils to the antenna circuit AC. The second control block CB2 automatically turns the controlled switches CS1, CS2, . . . on and off until the voltage at the terminal A attains the maximum value.

The tag's antenna circuit AC excited in its current environment by the voltage-controlled oscillator VCO tuned to the frequency of the interrogator carrier signal ics now has the resonance at the frequency of the interrogator carrier signal ics.

An output signal of a tag's transmitting circuit TC during tuning preferably gets weaker than later during transmitting.

According to a variant of the second embodiment of the circuit, the terminal A and the terminal A' of a coupling capacitor CC, which is connected between the tag's antenna circuit AC and an output terminal of the tag's transmitting circuit TC, are connected to the second and a third control input, respectively, of the second control block CB2. In this way, the second control block CB2 gets voltages a, a' at the terminals A and A', respectively, and a phase difference between them at each individual setting of tag's antenna circuit AC. Based on these data, the second control block CB2 determines a setting, at which the tag's antenna circuit AC attains resonance at the frequency of the interrogator carrier signal ics.

Figure 2B:
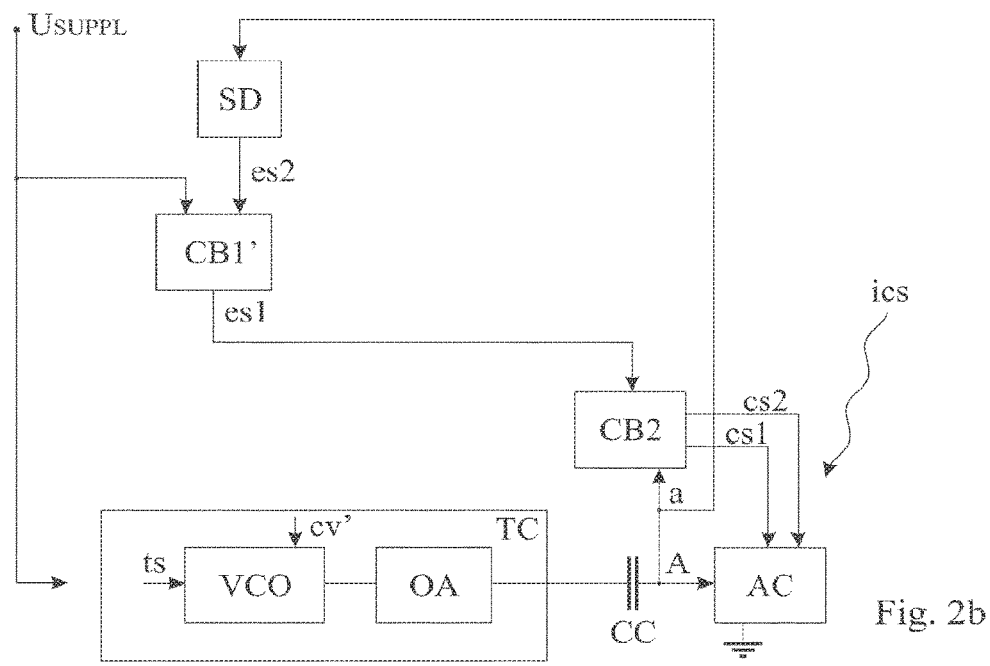
FIG. 2b illustrates a third embodiment of a circuit, according to which a tag's antenna circuit can be tuned by using an interrogator magnetic field.

A third embodiment of the circuit for tuning an antenna circuit AC of an actively transmitting tag to a frequency of an interrogator carrier signal ics after the tag has been inserted into a host device is shown in FIG. 2b. The embodiment is intended for the case that the antenna circuit AC should be tuned by only using the interrogator carrier signal ics.

A first enabling signal es1 is generated in a first control block CB1', which is foreseen to trigger tuning, after a supply voltage USUPPL as well as a second enabling signal es2 have been conducted to the block.

The second enabling signal es2 is generated in a signal detector SD. A terminal A of the tag's antenna circuit AC is connected to an input of the signal detector SD. The second enabling signal es2 is generated after presence of the interrogator carrier signal ics was detected at a location of the actively transmitting tag.

According to variants of the third embodiment of the circuit, the first enabling signal es1 at an output of the first control block CB1' is generated only after the supply voltage USUPPL was fed to the actively transmitting tag in the host device for the first time or again after a limited number (cf. above) of switch-ons, provided that at those times the actively transmitting tag is situated in an interrogator magnetic field.

The first enabling signal es1 is conducted to a first control input of a second control block CB2, which input is foreseen to enable the block. The terminal A of the tag's antenna circuit AC is connected to a second control input of the second control block CB2. The second control block CB2 automatically carries out tuning of the antenna circuit AC.

A first, a second and further outputs of the second control block CB2 are connected to a control terminal of a first, a second and further, respectively, controlled switches CS1, CS2, . . . foreseen for connecting a first, a second and further, respectively, capacitors C1, C2, . . . and/or a first, a second and further, respectively, coils to the antenna circuit AC. The second control block CB2 automatically turns the controlled switches CS1, CS2, . . . on and off until a voltage at the terminal A attains the maximum value.

The tag's antenna circuit AC excited in its current environment by only the interrogator carrier signal ics now reached resonance at the frequency of the interrogator carrier signal ics.

A tag's voltage-controlled oscillator VCO, otherwise controlled by a stored control voltage cv', is non-operative during the tuning.

What is claimed is:

1. A circuit for tuning an actively transmitting tag to a frequency of an interrogator carrier signal, the circuit comprising:
    an antenna circuit comprising a plurality of capacitors and an inductor, the antenna circuit configured to transmit an output signal upon receiving an input transmit signal;
    a first control block configured to transmit an enabling signal upon detecting a presence of a supply voltage at a feeding terminal of the actively transmitting tag in response to the actively transmitting tag being inserted into a host device;
    a memory configured to receive the enabling signal and generate a control voltage;

a voltage-controlled oscillator (VCO) configured to generate the input transmit signal with the frequency of the interrogator carrier signal upon receiving the enabling signal from the first control block and upon receiving the control voltage from the memory; and a second control block configured to enable a subset of the plurality of capacitors of the antenna circuit upon receiving the enabling signal from the first control block, wherein enabling the subset of the plurality of capacitors is in accordance with matching a resonance of the antenna circuit at the frequency of the interrogator carrier signal corresponding to the input transmit signal received from the VCO.

2. The circuit of claim 1, wherein the first control block is further configured to limit the transmitting of the enabling signal to a first time the supply voltage at the feeding terminal of the actively transmitting tag is detected.

3. The circuit of claim 1, wherein the first control block is further configured to transmit a second enabling signal upon detecting an interruption of the supply voltage at the feeding terminal of the actively transmitting tag.

4. The circuit of claim 1, wherein the first control block is further configured to limit the transmitting of the enabling signal to a predetermined number of first switch-ons.

5. The circuit of claim 1, wherein the enabling signal is transmitted during an absence of a magnetic field of the interrogator carrier signal.

6. The circuit of claim 1, wherein the second control block is further configured to enable the subset of the plurality of capacitors in accordance with detecting a maximum voltage corresponding to the input transmit signal.

7. A circuit for tuning an actively transmitting tag to a frequency of an interrogator carrier signal, the circuit comprising:

an antenna circuit comprising a plurality of capacitors and an inductor, the antenna circuit configured to transmit an output signal upon receiving an input transmit signal;

a signal detector configured to generate a first enabling signal upon detecting the interrogator carrier signal at a location of the actively transmitting tag;

a first control block configured to transmit a second enabling signal upon detecting a presence of a supply voltage at a feeding terminal of the actively transmitting tag in response to the actively transmitting tag being inserted into a host device and upon receiving the first enabling signal from the signal detector;

a feedback circuit configured to receive the first enabling signal and the second enabling signal and generate a control voltage, the control voltage being determined in accordance with a closed-loop method;

a voltage-controlled oscillator (VCO) configured to generate the input transmit signal with the frequency of the interrogator carrier signal upon receiving the second enabling signal from the first control block and upon receiving the control voltage from the feedback circuit; and a second control block configured to enable a subset of the plurality of capacitors of the antenna circuit upon receiving the second enabling signal from the first control block, wherein the enabling the subset of the plurality of capacitors is in accordance with matching a resonance of the antenna circuit at the frequency of the interrogator carrier signal corresponding to the input transmit signal received from the VCO.

8. The circuit of claim 7, wherein the first control block is further configured to limit the transmitting of the second enabling signal to a first time the supply voltage at the feeding terminal of the actively transmitting tag is detected.

9. The circuit of claim 7, wherein the first control block is further configured to transmit a third enabling signal upon detecting an interruption of the supply voltage at the feeding terminal of the actively transmitting tag.

10. The circuit of claim 7, wherein the first control block is further configured to limit the transmitting of the second enabling signal to a predetermined number of first switch-ons.

11. The circuit of claim 7, further comprising a coupling capacitor configured to receive the input transmit signal, wherein the second control block is configured to monitor an input and output terminals of the coupling capacitor to determine the enabling of the subset of the plurality of capacitors of the antenna circuit.

12. The circuit of claim 7, wherein the second control block is further configured to enable the subset of the plurality of capacitors in accordance with detecting a maximum voltage corresponding to the input transmit signal.

13. A circuit for tuning an actively transmitting tag to a frequency of an interrogator carrier signal, the circuit comprising:

an antenna circuit comprising a plurality of capacitors and an inductor, the antenna circuit configured to transmit an output signal upon receiving an input transmit signal;

a signal detector configured to generate a first enabling signal upon detecting the interrogator carrier signal at a location of the actively transmitting tag;

a first control block configured to transmit a second enabling signal upon detecting a presence of a supply voltage at a feeding terminal of the actively transmitting tag in response to the actively transmitting tag being inserted into a host device and upon receiving the first enabling signal from the signal detector;

a voltage-controlled oscillator (VCO) configured to generate the input transmit signal with the frequency of the interrogator carrier signal; and a second control block configured to enable a subset of the plurality of capacitors of the antenna circuit upon receiving the second enabling signal from the first control block, wherein the enabling the subset of the plurality of capacitors is in accordance with matching a resonance of the antenna circuit at the frequency of the interrogator carrier signal corresponding to the input transmit signal received from the VCO.

14. The circuit of claim 13, wherein the first control block is further configured to limit the transmitting of the second enabling signal to a first time the supply voltage at the feeding terminal of the actively transmitting tag is detected.

15. The circuit of claim 13, wherein the first control block is further configured to transmit a third enabling signal upon detecting an interruption of the supply voltage at the feeding terminal of the actively transmitting tag.

16. The circuit of claim 13, wherein the first control block is further configured to limit the transmitting of the second enabling signal to a predetermined number of first switch-ons.

17. The circuit of claim 16, wherein the predetermined number of first switch-ons is application dependent.

18. The circuit of claim 17, wherein a maximum value of the predetermined number of first switch-ons corresponds with a maximum number of estimated possible reinsertions of the actively transmitting tag into the host device.

19. The circuit of claim 13, further comprising a coupling capacitor configured to receive the input transmit signal, wherein the second control block is configured to monitor an output terminal of the coupling capacitor to determine the enabling of the subset of the plurality of capacitors of the antenna circuit.

20. The circuit of claim 13, wherein the second control block is further configured to enable the subset of the plurality of capacitors in accordance with detecting a maximum voltage corresponding to the input transmit signal.

* * * * *